(12) United States Patent
Kiss (10) Patent No.: US 9,871,871 B2
(45) Date of Patent: *Jan. 16, 2018

(54) PULLING INFORMATION FROM INFORMATION SOURCES VIA REFER REQUESTS

(71) Applicant: Nokia Technologies Oy, Espoo (FI)

(72) Inventor: Krisztian Kiss, San Francisco, CA (US)

(73) Assignee: Nokia Technologies Oy, Espoo (FI)

( * ) Notice: Subject to any disclaimer, the term of this patent is extended or adjusted under 35 U.S.C. 154(b) by 336 days.

This patent is subject to a terminal disclaimer.

(21) Appl. No.: 14/858,209

(22) Filed: Sep. 18, 2015

(65) Prior Publication Data

US 2016/0014214 A1    Jan. 14, 2016

Related U.S. Application Data

(63) Continuation of application No. 11/725,230, filed on Mar. 15, 2007, now Pat. No. 9,203,918.

(51) Int. Cl.
*G06F 15/16* (2006.01)
*H04L 29/08* (2006.01)
*H04L 29/06* (2006.01)

(52) U.S. Cl.
CPC ........ *H04L 67/148* (2013.01); *H04L 65/1003* (2013.01); *H04L 65/1006* (2013.01); *H04L 67/24* (2013.01); *H04L 67/26* (2013.01)

(58) Field of Classification Search
CPC .................. H04L 65/1006; H04L 65/1003

(Continued)

(56) References Cited

U.S. PATENT DOCUMENTS 5,991,773 A    11/1999 Tagawa
6,094,573 A    7/2000 Heinonen et al.
(Continued)

FOREIGN PATENT DOCUMENTS

CN    1889676 A    1/2007
EP    1248484 A1    10/2002
WO    2004049673 A1    6/2004

OTHER PUBLICATIONS

Office Action for corresponding European Application No. 08709252.4-2413, dated Dec. 5, 2014, 4 pages.
(Continued)

*Primary Examiner* — Arvin Eskandarnia
(74) *Attorney, Agent, or Firm* — Ditthavong & Steiner, P.C.

(57) ABSTRACT

Methods, computer program products, information servers, information sources and a system are shown in the context of pulling information from information sources. At an information server, a refer request, which comprises an identifier of a refer-to entity to be referred to by a recipient of the refer request, is configured to trigger an information source to provide information upon reception of the refer request without referring to further information sources. The refer request is issued. At an information source, the refer request is received, and the refer request is checked to determine if information shall be provided by the information source in response to the refer request without referring to further information sources. The information is only provided if it is determined that the information shall be provided.

20 Claims, 4 Drawing Sheets

(58) Field of Classification Search
USPC .......................................................... 709/228
See application file for complete search history.

(56) References Cited

U.S. PATENT DOCUMENTS

| | | | |
|---|---|---|---|
| 6,141,333 | A | 10/2000 | Chavez, Jr. |
| 6,182,111 | B1 | 1/2001 | Inohara et al. |
| 6,785,769 | B1 | 8/2004 | Jacobs et al. |
| 2003/0018704 | A1 | 1/2003 | Polychronidis et al. |
| 2003/0028597 | A1 | 2/2003 | Salmi et al. |
| 2003/0037103 | A1 | 2/2003 | Salmi et al. |
| 2003/0065788 | A1 | 4/2003 | Salomaki |
| 2003/0177099 | A1* | 9/2003 | Gallant et al. .................. 705/52 |
| 2005/0201320 | A1 | 9/2005 | Kiss et al. |
| 2006/0046757 | A1* | 3/2006 | Hoover et al. ................ 455/518 |
| 2006/0239253 | A1* | 10/2006 | Gallant et al. ................ 370/352 |
| 2007/0182541 | A1* | 8/2007 | Harris et al. .................. 340/506 |
| 2008/0175253 | A1* | 7/2008 | Rahman et al. ......... 370/395.52 |
| 2009/0017856 | A1* | 1/2009 | Albertsson et al. .......... 455/518 |

OTHER PUBLICATIONS

English language Indian Examination Report corresponding to Indian Application No. 5875/CHENP/2009, dated Jan. 13, 2015, 3 Pages.

Office Action for corresponding European Patent Application No. 08709252.4-2413, dated Nov. 29, 2013, 4 pages.

Office Action with English Language Summary for corresponding Chinese Application No. 200880007754.2, dated May 6, 2013, 5 pages.

Office Action for corresponding Chinese Patent Application No. 200880007754.2, dated Jun. 8, 2012, 5 pages.

Office Action for corresponding Chinese Patent Application No. 20080007754.2, dated Nov. 24, 2011, 4 pages.

Office Action for corresponding European Application No. 08709252.4-2413, dated Apr. 8, 2011, 4 pages.

Office Action for corresponding Korean Application No. 10-2009-7019042, dated Feb. 17, 2011, 8 pages.

International Preliminary Report on Patentability for corresponding International Application No. PCT/EP2008/052437, dated Sep. 15, 2009, 7 pages.

Office Action for corresponding Russian Application No. 2009137874/08(053559), dated Dec. 24, 2010, 25 pages.

International Search Report and Written Opinion dated Nov. 26, 2008 for corresponding International Application No. PCT/EP2008/052437, 16 pages.

Rosenberg et al., "SIP Session Initiation Protocol," Network Working Group, The Internet Society, Jun. 2002.

Levin, "Suppression of Session Initiation Protocol (SIP) REFER Method Implicit Subscription," Network Working Group, The Internet Society, May 2006.

Izaguirre, "Pulling Presence Information from Presence Sources", Open Mobile Alliance, Change Request, Jan. 30, 2007.

Sparks, "The Session Initiation Protocol (SIP) Refer Method", Network Working Group, The Internet Society, Apr. 2003.

Open Mobile Alliance, "Presence SIMPLE Specification," Draft Version 2.0, OMA-TS-Presence_SIMPLE-V2_0-20070219-D, Feb. 19, 2007.

Wikipedia Free Encyclopedia, "Presence Information," retrieved from http://en.wikipedia.org/w/index.php?title=Presence_information&printable=yes, printed Mar. 7, 2007.

* cited by examiner

PULLING INFORMATION FROM INFORMATION SOURCES VIA REFER REQUESTS

RELATED APPLICATION

This patent document is a continuation of U.S. patent application Ser. No. 11/725,230, filed on Mar. 15, 2007, entitled "Pulling Information From Information Sources Via Refer Requests," which is incorporated herein by reference in its entirety.

BACKGROUND OF THE INVENTION

1. Technical Field

This invention relates to methods, computer program products, information servers, information sources and a system in the context of pulling information from information sources, and in particular in the context of pulling presence information from presence sources.

2. Discussion of Related Art

Presence information may be understood as a status indicator that expresses an ability and/or willingness of a potential communication partner, for instance a user of a computer or telecommunications network, to communicate. Presence information is provided by presence sources, for instance specific agents in a user's client, to a presence service. In this context, a so-called presentity (a combination of the words "presence" and "entity") is understood as an entity that has presence information associated with it, wherein said presence information may be composed from a multitude of presence sources. A presentity may for instance be a person, although it might also represent a "help desk", or a resource such as a meeting room, to give but a few examples. A presence server accepts, stores and distributes presence information. A watcher is understood as an entity that requests presence information about a presentity from the presence service. A watcher may for instance be a person that wants to communicate with another person (the presentity) and thus requires presence information on this presentity.

Using presence information is a growing tool towards more effective and efficient communication within a business setting, since it allows (a watcher) to instantly see who (the one or more presentities) is for instance available in a corporate network for a short-term meeting or a conference call.

In document "Presence SIMPLE Specification", Draft Version 2.0, 19 Feb. 2007, by Open Mobile Alliance (OMA), which document is incorporated herein by reference, an application-level specification for the OMA Session Initiation Protocol (SIP)/SIP Instant Message and Presence Leveraging Extensions (SIMPLE) presence service is defined.

For this presence service, it is desired that the presence service supports the pulling (retrieval) of presence information from presence sources (e.g. network entities, user agents, etc.) either ad-hoc or on a periodic basis. Furthermore, it is desired that watchers may be able to request the presence server to pull presence information from presence sources.

SUMMARY

According to a first aspect of the present invention, which is directed to an information server, a method is proposed, the method comprising configuring, at an information server, a refer request, which refer request comprises an identifier of a refer-to entity to be referred to by a recipient of the refer request, to trigger an information source to provide information upon reception of the refer request without referring to further information sources, and issuing the refer request.

According to the first aspect of the present invention, further a computer-readable medium having a computer program stored thereon is proposed, the computer program comprising instructions operable to cause a processor to perform the method according to the first aspect of the present invention.

Also the computer program itself is understood to be within the scope of the present invention.

According to the first aspect of the present invention, even further an information server is proposed, the information server comprising a processing unit adapted to configure a refer request, which refer request comprises an identifier of a refer-to entity to be referred to by a recipient of the refer request, to trigger an information source to provide information upon reception of the refer request without referring to further information sources, and an interface adapted to issue the refer request.

According to the first aspect of the present invention, even further an information server is proposed, the information server comprising means for configuring, at an information server, a refer request, which refer request comprises an identifier of a refer-to entity to be referred to by a recipient of the refer request, to trigger an information source to provide information upon reception of the refer request without referring to further information sources, and means for issuing the refer request.

The information server may for instance be understood as an entity that accepts, stores and distributes information. The information comprises all types of data pertaining to a specific entity, and is provided by an information source, which may be understood as any entity that is capable of providing such information.

At the information server, a refer request is configured. This configuration may for instance comprise setting parameters in a pre-defined structure of mandatory and/or optional parameters for the refer request. The pre-defined structure may for instance be laid down in a protocol specification.

The refer request comprises an identifier of a refer-to entity. This refer-to entity shall be referred to by a recipient of the refer request, for instance in order to contact the refer-to entity. Therein, said refer-to entity is different from said information server.

The refer request is configured in a way that an information source, which receives the refer request, is triggered to provide information without referring to further information sources. This may for instance be achieved by setting parameters in the refer request in a way that the receiving information source is informed that information shall be provided without referring to further information sources. For instance, the identifier of the refer-to entity in the refer request may be set to an identifier of the information source itself, or to an identifier of a specific entity, for instance an entity to which the information provided by the information source pertains, so that the information source may recognize from this identifier that information shall be provided without referring to further information sources.

Using the identifier of the refer-to entity to inform the information source that information shall be provided without referring to further information sources allows to pull information from the information source via a refer request without requiring an introduction of further parameters in the refer request. The refer request may then be issued, for instance towards the information source.

According to a first embodiment of the first aspect of the present invention, the refer request is a REFER request according to the Session Initiation Protocol SIP.

The SIP is an application-layer control (signaling) protocol for creating, modifying, and terminating sessions with one or more participants. These sessions include Internet telephone calls, multimedia distribution, and multimedia conferences. The SIP is defined in RFC3261, which is incorporated herein by reference. REFER requests according to the SIP are defined in RFC3515, which is also incorporated herein by reference. If the refer request is a SIP REFER request, the identifier of the refer-to entity may be comprised in a "Refer-To" header field, for instance as a uniform resource identifier. Furthermore, if the refer request is a SIP REFER request, the configuring may comprise setting a method parameter of a "Refer-To" header field of the SIP REFER request to "PUBLISH".

According to a second embodiment of the first aspect of the present invention, the information is presence information, the information source is a presence source, and the presence information provided by the presence source pertains to a presentity. Presence information may be understood as a status indicator that expresses an ability and/or willingness of a potential communication partner, for instance a user of a computer or telecommunications network, to communicate. Presence information is provided by presence sources, for instance specific agents (e.g. Presence User Agents, Presence Network Agents, and Presence External Agents), to a presence service. Such an agent may for instance be included in the user's client. A presentity is understood as an entity that has presence information associated with it, wherein the presence information may be composed from a multitude of presence sources. A presentity may for instance be a person, although it might also represent a "help desk", or a resource such as a meeting room, to give but a few examples.

According to a third embodiment of the first aspect of the present invention, the configuring comprises setting the identifier of the refer-to entity to an identifier of an entity to which the information pertains.

The information source may then recognize from the identifier of the entity, to which the information that can be provided by the information source pertains, that it is not necessary to refer to further information sources for the information. For instance, if the information is presence information, and if the information source is a presence source, the entity to which the information pertains may be a presentity, and the presence information provided by the presence source then is related to the presentity. In this case, when receiving a refer request with an identifier of the refer request set to an identifier of the presentity, the presence source is thus informed that presence information shall be provided without referring to further presence sources.

According to a fourth embodiment of the first aspect of the present invention, the configuring comprises setting an identifier of the recipient of the refer request to an identifier of one of the information source and an entity to which the information pertains. This setting may be performed alone, or in combination with the setting according to the third embodiment of the first aspect of the present invention. If the identifier of the information source is known, it may be directly used as recipient identifier. Otherwise, it may be more advantageous to use only the identity of an entity to which the information provided by the information source pertains, for instance the identifier of a presentity to which the presence information provided by a presence source pertains.

According to a fifth embodiment of the first aspect of the present invention, the configuring comprises setting an identifier of an originator of the refer request to an identifier of an entity to which the information pertains. This setting may be performed alone, or in combination with the setting according to the third and/or fourth embodiment of the first aspect of the present invention. By setting the originator identifier of the refer request to a specific identifier, the information source receiving the refer request may be informed that information shall be provided without requiring reference to further information sources. Furthermore, by setting the originator identifier to a specific identifier, the information source may be enabled to perform an authorization of the pulling for information. For instance, pulling of information via the refer request may only be considered to be authorized if the identifier of the originator of the refer request and the identifier of the refer-to entity in the refer request both equal a specific identifier, for instance an identifier of an entity to which the information provided by the information source pertains, as for instance a presentity.

According to a sixth embodiment of the first aspect of the present invention, the configuring comprises setting a parameter of the refer request to a value that ensures that the recipient of the refer request does not create a subscription with an issuer of the refer request. Such a subscription (which, in case of a SIP REFER request, is mandated by RFC3515) may be considered unnecessary for this refer use case, since the issuer of the refer request (for instance the presence server) may typically point back to itself in the refer-to header (not to a third-party), so that it will eventually learn whether the referred publication is successful or not. If the refer request is a SIP REFER request, the parameter may for instance be a "Refer-Sub" header field of the REFER request. Suppressing implicit subscription due to a SIP REFER request is defined in RFC4488, which is incorporated herein by reference.

This setting may be performed alone, or in combination with single or all settings of the previous embodiments of the first aspect of the present invention.

According to a seventh embodiment of the first aspect of the present invention, the refer request is issued towards an identifier of an entity to which the information pertains. The entity may for instance be a presentity, and the identifier may be a uniform resource identifier of the presentity. A presence server then may not be required to know the specific identifier of the presence source, but only requires knowledge of the identifier (e.g. the uniform resource identifier) of the presentity to issue the refer request. A routing of the refer request may then for instance be encoded in an Internet Protocol Multimedia Subsystem IMS initial Filter Criteria iFC. This IMS iFC may for instance instruct a Serving Call State Control Function (S-CSCF) to route the refer request to a Presence Network Agent (PNA) hosted in an Application Server (AS).

According to a second aspect of the present invention, which is directed to an information source, a method is proposed, the method comprising receiving, at an information source, a refer request, wherein the refer request comprises an identifier of a refer-to entity to be referred to by a recipient of the refer request, checking the refer request to determine if information shall be provided by the information source in response to the refer request without referring to further information sources, and providing the information, if it is determined that the information shall be provided.

According to the second aspect of the present invention, further a computer-readable medium having a computer program stored thereon is proposed, the computer program comprising instructions operable to cause a processor to perform the method according to the second aspect of the present invention. Also the computer program itself is understood to be in the scope of the present invention.

According to the second aspect of the present invention, even further an information source is proposed, comprising an interface adapted to receive a refer request, wherein the refer request comprises an identifier of a refer-to entity to be referred to by a recipient of the refer request, a processing unit adapted to check the refer request to determine if information shall be provided by the information source in response to the refer request without referring to further information sources, and adapted to provide the information, if it is determined that the information shall be provided.

According to the second aspect of the present invention, even further an information source is proposed, comprising means for receiving a refer request, wherein the refer request comprises an identifier of a refer-to entity to be referred to by a recipient of the refer request, means for checking the refer request to determine if information shall be provided by the information source in response to the refer request without referring to further information sources, and means for providing the information, if it is determined that the information shall be provided.

It is understood that the above description of the first aspect of the present invention and its embodiments also applies to the second aspect of the present invention and its following embodiments.

The information source receives a refer request, which may for instance have been configured by an information server to trigger the information source to provide information (e.g. to the information server) without referring to further information sources. The information source checks the refer request to determine if information shall be provided without referring to further information sources, and provides information only in case that it is decided that the information shall be provided. The checking may for instance comprise checking specific parameters in the refer request.

According to a first embodiment of the second aspect of the present invention, the refer request is a REFER request according to the Session Initiation Protocol SIP.

According to a second embodiment of the second aspect of the present invention, the information is presence information, the information source is a presence source, and the presence information provided by the presence source pertains to a presentity.

According to a third embodiment of the second aspect of the present invention, the checking comprises checking if the identifier of the refer-to entity and an identifier of an originator of the refer request both equal an identifier of an entity to which the information pertains, wherein the information is only provided if the checking is positive. This checking may for instance serve to authorize the pulling of information. For instance, only a presence server that is associated with a presentity's domain may be allowed to retrieve presence information from the presence source, and this may be confirmed by checking if both the originator identifier of the refer request and the identifier of the refer-to entity both are equal to the identifier (e.g. the uniform resource identifier) of the presentity.

According to a fourth embodiment of the second aspect of the present invention, the checking comprises checking if a parameter of the refer request is set to a value that indicates that the information source shall provide the information, wherein the information is only provided if the checking is positive. If the refer request is a SIP REFER request, the parameter may for instance be the "method" parameter of the "Refer-To" header field of the SIP REFER request. The information may only be provided if the checking reveals that this "method" parameter is set to "PUBLISH". The checking according to this fourth embodiment of the second aspect of the present invention may be performed alone, or in combination with the checking according to the third embodiment of the second aspect of the present invention.

According to a fifth embodiment of the second aspect of the present invention, the method according to the second aspect of the present invention further comprises checking if a parameter in the refer request is set to indicate that the recipient shall not create a subscription with an issuer of the refer request, and setting, if the checking is positive, an according parameter in a response to the refer request. If the refer request is a SIP REFER request, the parameter may for instance be the "Refer-Sub" header field, and if the parameter is set to "false" to indicate that no subscription shall be performed, the information source will set a "Refer-Sub" header field to the value of "false" in a "200 OK" response of the SIP REFER request to the information server.

According to a third aspect of the present invention, which is directed to system, a method is proposed, the method comprising the steps of the methods according to the first and second aspect of the present invention.

According to the third aspect of the present invention, further a system is proposed, the system comprising an information server according to the first aspect of the present invention and an information source according to the second aspect of the present invention.

It is understood that the above description of the first and second aspects of the present invention and their embodiments also applies to the third aspect of the present invention.

The features of the present invention and of its exemplary embodiments as presented above are understood to be disclosed also in all possible combinations with each other.

These and other aspects of the invention will be apparent from and elucidated with reference to the detailed description presented hereinafter.

DETAILED DESCRIPTION OF THE INVENTION

In the following detailed description of the present invention, exemplary embodiments of the present invention will be described in the context of a presence system, for instance a presence system according to the Open Mobile Alliance (OMA) Presence Session Initiation Protocol (SIP) Instant Message and Presence Leveraging Extensions (SIMPLE) Specification. It is readily understood by a person skilled in the art that the present invention is not limited to application in presence systems only, but can equally well be deployed in all types of systems in which information is to be pulled from information sources.

The current solution for presence publication, as described in document "Presence SIMPLE Specification", Draft Version 2.0, 19 Feb. 2007, by Open Mobile Alliance (OMA), only provides a push-based solution, where the presence sources push presence information to the presence server via the SIP PUBLISH method (defined in Request for Comments (RFC) document RFC3903).

It is not currently possible for the presence server to pull information from presence sources based on local configuration or watcher preferences.

In document "Pulling Presence Information from Presence Sources" by E. Izaguirre, Jan. 30, 2007, document number "OMA-PAG-2007-0028-CR_PRS2_retrieving_pinfo_from_psources.doc", a method for pulling information from presence sources is described. This solution requires that a SIP event notifier is implemented in a presence source, and thus requires handling extra states (i.e. timers, SIP dialogs, etc.). If the presence source was located in a mobile terminal, this would be particularly a concern. Furthermore, the described method requires that the presence server is always hard-coded with a presence source address, which would make the presence architecture, routing and place of presence sources rather inflexible. The described method further has some issues with respect to the routing of SIP messages. Firstly, the Route header field is misused, and secondly, when the presence server issues the SUBSCRIBE towards the presence source, this SUBSCRIBE request could trigger an Internet Protocol (IP) Multimedia Subsystem (IMS) initial Filter Criteria (iFC) in the Serving Call State Control Function (S-CSCF), which may be the same as the one used for routing the SUBSCRIBE request from the watcher to the presence server.

Figure 1:
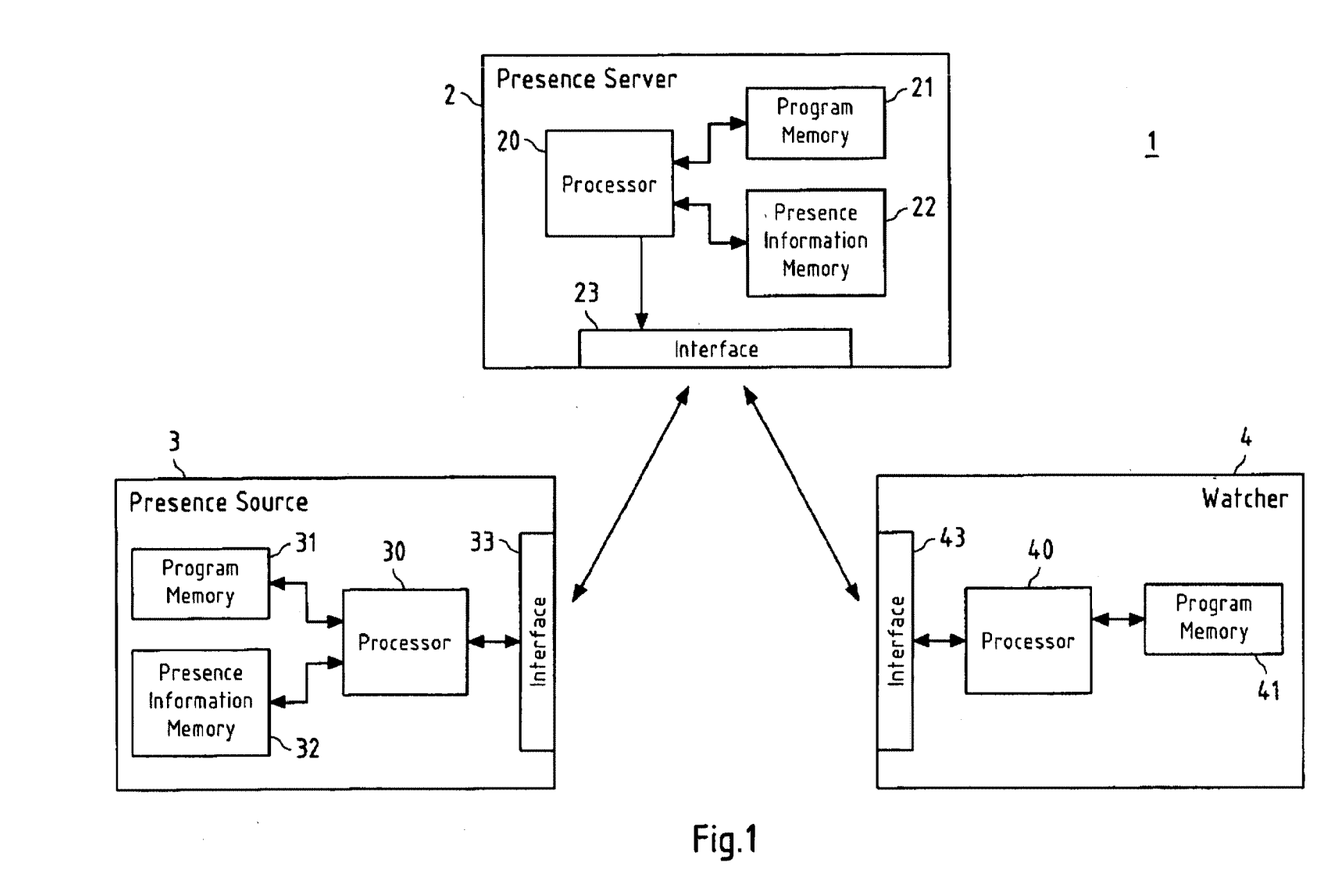
FIG. 1: a schematic block diagram of an exemplary embodiment of a presence system according to the present invention.

FIG. 1 depicts a schematic block diagram of an exemplary embodiment of a presence system 1 according to the present invention. System 1 comprises a presence server 2, a presence source 3 and a watcher 4. Therein, it is readily understood that presence system 1 may equally well comprise several presence sources 3 and/or watchers 4.

Presence server 2 is an entity that accepts, stores and distributes presence information. Furthermore, presence server 2, inter alia, handles publications from one or multiple presence sources, composes the presence information received from one or multiple presence sources into a single presence document, and handles subscriptions from watchers to presence information and generates notifications about the presence information state changes. The operation of presence server 2 is controlled by a processor 20, based on program code stored in program memory 21. The operation of presence server 2 will be described in more detail with reference to FIGS. 2 and 4 below. Presence server 2 further comprises a presence information memory 22 for storing presence information pulled from presence sources, and an interface 23 for transmitting and/or receiving messages.

Presence source 3 is an entity that provides presence information pertaining to one (or more) presentities to presence server 2. Presence source 3 may for instance be located in a user's terminal or within a network entity. The operation of presence source 3 is controlled by a processor 30, based on program code stored in program memory 31. This operation will be described in more detail with reference to FIGS. 3 and 4 below. Presence source 3 further comprises a presence information memory 32 for storing presence information pertaining to a presentity, and an interface 33 for transmitting and/or receiving messages.

Watcher 4 is an entity that requests presence information about a presentity from the presence server. Watcher 4 comprises a processor 40 for controlling its operation, based on program code stored in program memory 41. Furthermore, watcher 4 comprises an interface 43 for transmitting and/or receiving messages.

Figure 2:
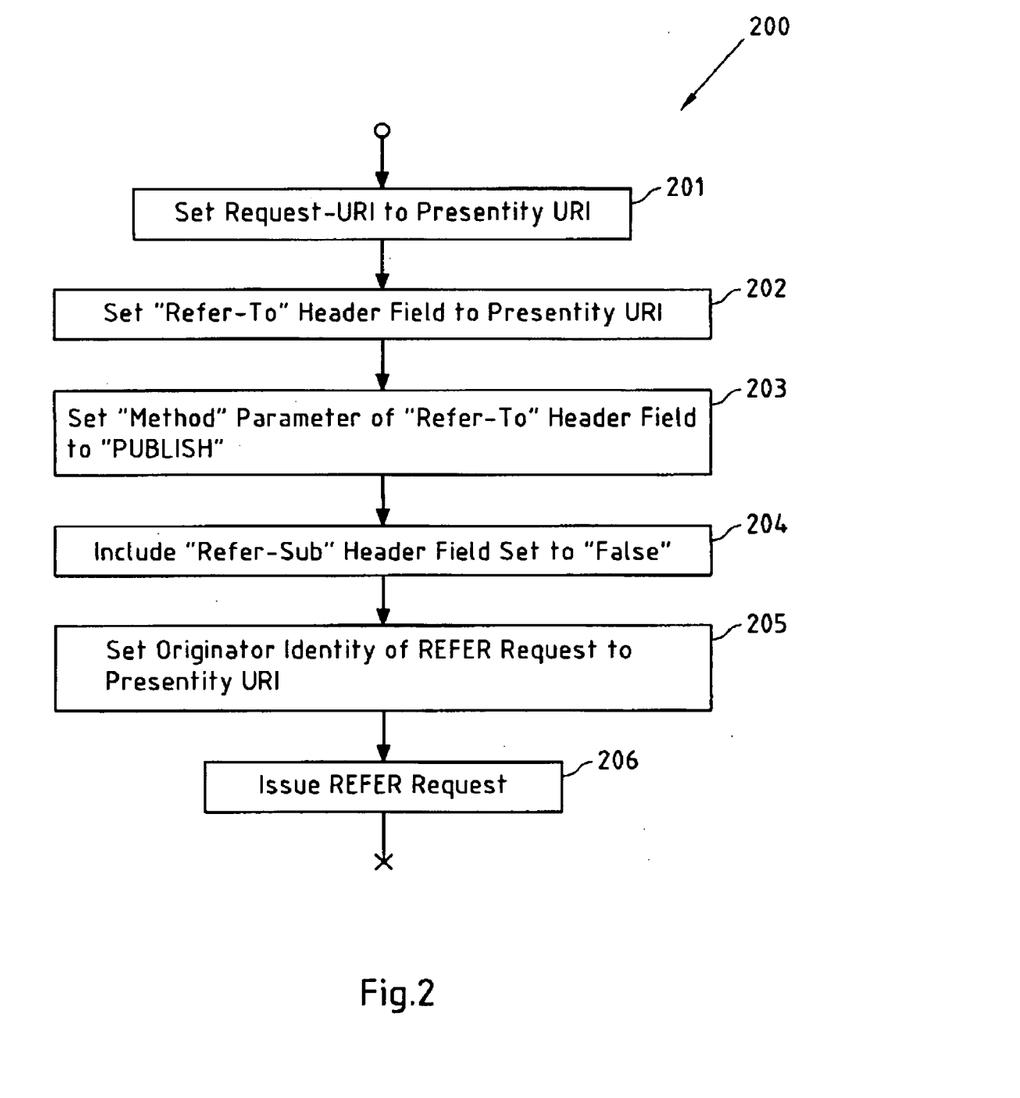
FIG. 2: a flowchart of an exemplary embodiment of a presence-server-side method according to the present invention.

FIG. 2 is a flowchart 200 of an exemplary embodiment of a presence-server-side method according to the present invention. The steps 201-206 of flowchart 200 may for instance be performed by presence server 2 (see FIG. 1) to pull presence information from presence source 3. This is performed in steps 201-205 by configuring an SIP REFER request (as defined in RFC3515 and RFC4488) to trigger presence source 3 to provide information without referring to further presence sources. In step 206, the configured REFER request is then issued towards presence source 3.

Issuing a REFER request to retrieve presence information from one or more presence sources according to the procedures in RFC3515 and RFC4488 may for instance be based on subscription preferences of watcher 4 or on local configuration in presence server 2.

As illustrated in the flowchart 200 of FIG. 2, presence server 2 performs the following steps:

In a step 201, the request-URI is set to the presentity URI unless the local configuration instructs to include another SIP URI in there. If the local configuration includes multiple target URIs, multiple REFER requests are issued.

In a step 202, the "Refer-To" header field of the REFER request is set to the presentity URI.

In a step 203, the "method" parameter of the "Refer-To" header filed is set to the value "PUBLISH".

In a step 204, a "Refer-Sub" header field, set to "false", is included according to the procedures described in RFC4488, i.e. to prevent implicit subscription.

In a step 205, the originator identity of the request is set to the presentity URI as if the request was sent on behalf of the presentity.

As already stated, after the configuration of the SIP REFER request is completed, the presence server 2 (see FIG. 1) issues the REFER request in a step 206, for instance via interface 23. Therein, presence server 2 may issue the REFER request towards the presentity URI, i.e. presence server 2 may not need to be aware of the presence source address. The particular routing of the REFER request may for instance be encoded in an Internet Protocol Multimedia Subsystem (IMS) initial Filter Criteria (iFC). This IMS iFC may for instance instruct a Serving Call State Control Function (S-CSCF) to route the REFER request to a Presence Network Agent (PNA) hosted in an Application Server (AS). Equally well, the presence server may be locally configured with a presence source address. In that case the presence server issues the REFER request targeting the configured address.

With respect to the flowchart 200 of FIG. 2, if an SIP/IP core network of the presence system corresponds to the Third Generation Partnership Project (3GPP) IP Multimedia Subsystem (IMS) or the 3GPP2 Multi-Media Domain (MMD) networks, the presence server may furthermore include the presentity URI to the P-Asserted-Identity header field used in the SIP REFER request as defined in documents 3GPP TS 24.229 and 3GPP2 X.S0013-004-A, which are both incorporated herein by reference.

Figure 3:
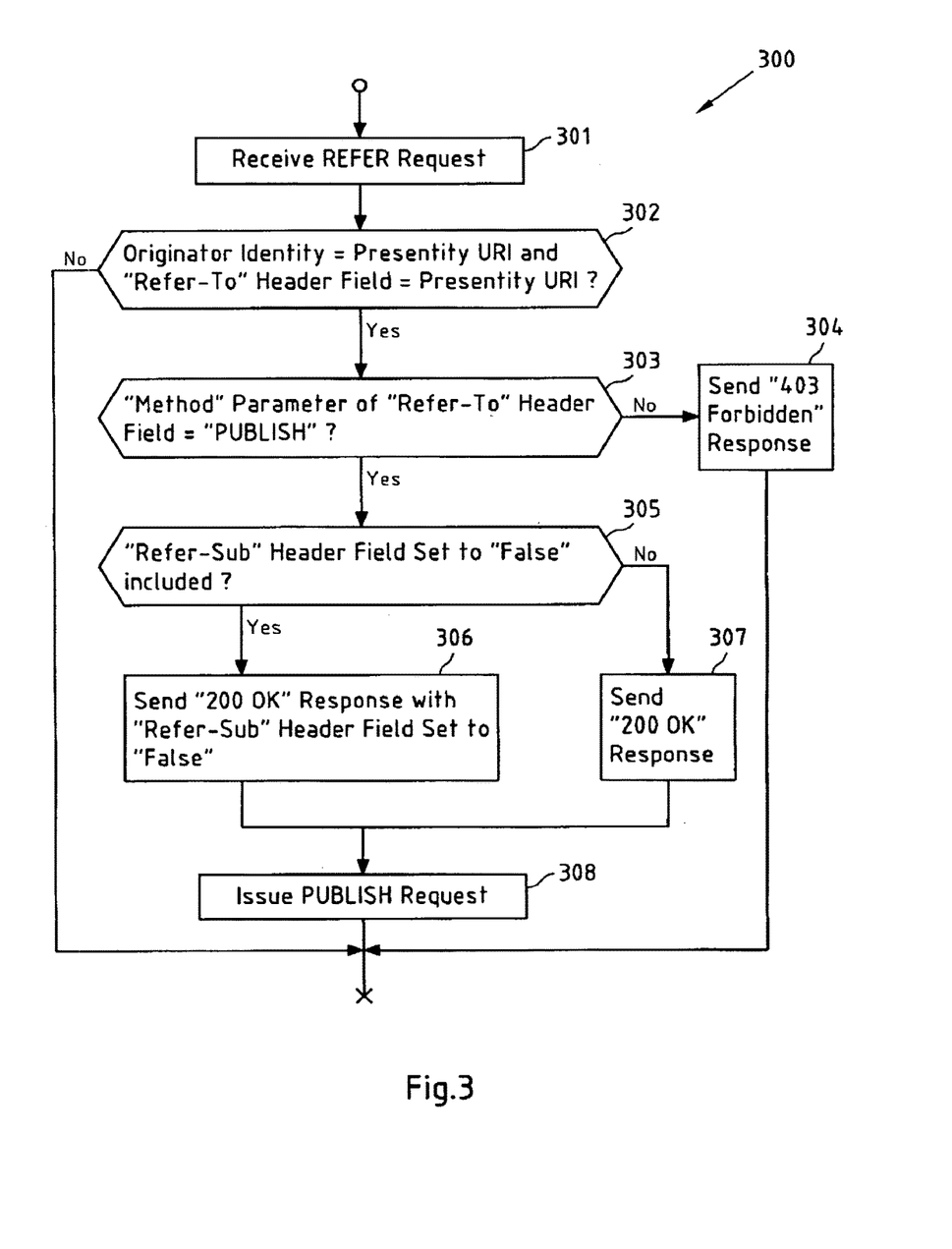
FIG. 3: a flowchart of an exemplary embodiment of a presence-source-side method according to the present invention.

FIG. 3 is a flowchart of an exemplary embodiment of a presence-source-side method according to the present invention. The steps 301-308 of flowchart 300 may for instance be performed by presence source 3 (see FIG. 1) when receiving a SIP REFER request from presence server 2. To be able to support pulling of presence information via SIP REFER requests, the presence source supports the SIP REFER method as defined in RFC3515 and the suppression of the REFER method implicit subscription as defined in RFC4488.

In a first step 301, the SIP REFER request is received by the presence source, for instance via interface 33 of presence source 3 (see FIG. 1).

Before accepting a REFER request, presence source 3 performs authorization of the presence information retrieval, for instance per local policy. The default local policy may for instance be to allow to retrieve presence information requested only by the presence server associated with the presentity's domain. This is equivalent to a REFER request where both the originator identity of the request and the "Refer-To" header field have the value of the presentity URI.

This is checked in step 302 of flowchart 300. If this checking is negative, the method terminates. Otherwise, i.e. in case of successful authorization, the method continues to step 303 and checks the "method" parameter of the "Refer-To" header field. For any other values than "method=PUBLISH", the presence source rejects the REFER request with a "403 Forbidden" response, see step 304.

Otherwise, i.e. if the "method" parameter of the "Refer-To" header field has the value "PUBLISH", the presence source accepts the REFER request and sends a "200 OK" response, see step 307. If the REFER request included a "Refer-Sub" header filed set to "false", which is checked in step 305, a "Refer-Sub" header field set to "false" is included into the "200 OK" response according to the procedures described in RFC4488, see step 306.

Finally, in a step 308, the presence source 3 performs publication of presence information and issues a PUBLISH request.

Figure 4:
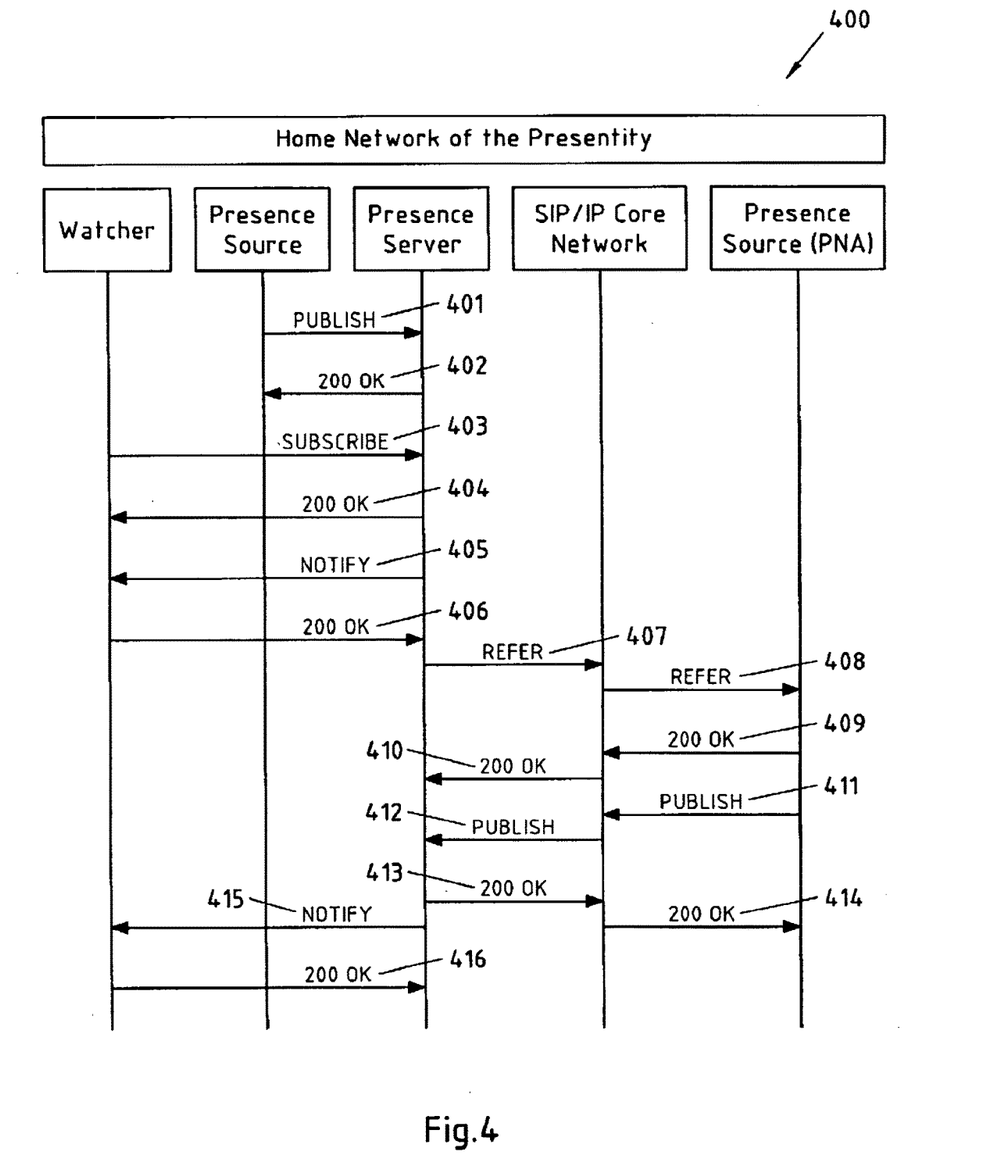
FIG. 4: a diagram illustrating pulling of presence information according to an exemplary embodiment of the present invention.

FIG. 4 is a diagram 400 illustrating pulling of presence information according to an exemplary embodiment of the present invention. In particular, the exchange of SIP messages 401-416 between a watcher (e.g. watcher 4 of system 1 of FIG. 1), a presence source (e.g. presence source 3 of system 1 of FIG. 1), a presence server (e.g. presence server 2 of system 1 of FIG. 1), an SIP/IP core network and a presence source Presence Network Agent (PNA) (i.e. a further presence source) in a home network of a presentity is depicted. Therein, the SIP/IP core network between the presence server and the watcher, and between the presence server and the PNA is not shown in FIG. 4 for the sake of simplicity.

In the diagram 400 of FIG. 4, a presence source first generates a SIP PUBLISH request 401, which contains a presence document related to a presentity. The presence server authorizes the presence publication, processes the presence information and sends a SIP 200 OK response 402 back to the presence source.

When a watcher wishes to subscribe for presence information about the presentity, it sends a SIP SUBSCRIBE request 403 to the presence server. The presence server then performs the necessary authorization checks on the watcher to ensure that it is allowed to watch the presentity, processes the subscription and sends a SIP 200 OK 404 response back to the watcher.

Furthermore, the presence server generates a NOTIFY request 405, which contains a presence document for the watcher based on previous publication 401. Upon reception of this NOTIFY request, the watcher sends a SIP 200 OK response 406 to the presence server.

Based on the watcher subscription preferences or local configuration, the presence server then issues an SIP REFER request 407 to trigger presence publication by the PNA (presence source). This SIP REFER request 407 may for instance have been configured according to the steps 201-205 of flowchart 200 of FIG. 2. This REFER request is forwarded by the SIP/IP core network to the PNA according to filtering rules.

The PNA receives the REFER request and checks the REFER request to determine if presence information shall be provided without referring to further presence sources, for instance by performing the steps 302-305 of flowchart 300 of FIG. 3. If the PNA accepts the REFER request, it replies with a SIP 200 OK response 409 to the SIP/IP core network (also see steps 306 and 307 of the flowchart 300 of FIG. 3).

The SIP/IP core network forwards the SIP 200 OK response 410 to the presence server.

Furthermore, the PNA generates a PUBLISH request 411 which contains a presence document related to the presentity (also see step 308 of the flowchart 300 of FIG. 3), which is forwarded as PUBLISH request 412 by the SIP/IP core network to the presence server according to filtering rules.

The presence server authorizes the presence publication, processes the presence information and sends a SIP 200 OK response 413 back to the PNA, which is forwarded as SIP 200 OK response 414 by the SIP/IP core network to the PNA.

The presence server combines the newly published presence information with the existing information and generates a NOTIFY request 415 which contains the presence document authorized for the watcher.

Finally, the watcher sends a SIP 200 OK response 416 to the presence source.

The invention has been described above by means of exemplary embodiments. In particular, the invention was exemplarily described to make use of the "SIP REFER method" (RFC3515) together with "The suppression of SIP REFER method implicit subscription" (RFC4488). The presence server was exemplarily described to issue a REFER request towards the presence source to trigger the presence source to initiate a PUBLISH request. Furthermore, since an implicit subscription is not necessary as described in RFC3515, the procedures in RFC4488 were exemplarily described to be utilized to eliminate the unnecessary implicit subscription. It should be noted that there are alternative ways and variations which are obvious to a skilled person in the art and can be implemented without deviating from the scope and spirit of the appended claims.

It is readily clear for a skilled person that the logical blocks in the schematic block diagrams as well as the flowchart and algorithm steps presented in the above description may at least partially be implemented in electronic hardware and/or computer software, wherein it depends on the functionality of the logical block, flowchart step and algorithm step and on design constraints imposed on the respective devices to which degree a logical block, a flowchart step or algorithm step is implemented in hardware or software. The presented logical blocks, flowchart steps and algorithm steps may for instance be implemented in one or more digital signal processors, application specific integrated circuits, field programmable gate arrays or other programmable devices. The computer software may be stored in a variety of storage media of electric, magnetic, electro-magnetic or optic type and may be read and executed by a processor, such as for instance a microprocessor. To this end, the processor and the storage medium may be coupled to interchange information, or the storage medium may be included in the processor.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

The invention claimed is:

1. A method, comprising:
    configuring, at an information server, a refer request for requesting information pertaining to a refer-to entity, wherein the refer request comprises an identifier of the refer-to entity that is a recipient of the refer request and a pre-defined parameter value that eliminates a subscription to the recipient by the information server, the recipient being a network entity different from the information server and external information sources, and
    issuing, by the information server, the refer request to the recipient.

2. A method of claim 1, wherein the refer request includes the information server in a refer-to header, and the information is presence information of the recipient.

3. A method of claim 2, wherein the refer request is a refer request according to the session initiation protocol, and the pre-defined parameter value is included in a refer-sub header field of the refer request.

4. A method of claim 1, wherein the refer request is forwarded by a session initiation protocol core network to the recipient based on one or more filtering rules.

5. A method of claim 4, further comprising:
    encoding a routing of the refer request in an internet protocol multimedia subsystem initial filter criterion.

6. A method of claim 1, wherein the refer request further comprises another pre-defined parameter value that triggers the recipient to provide the information upon reception of the refer request without referring to external information sources.

7. A method of claim 6, wherein the another pre-defined parameter is a method parameter of publishing the information by the recipient, the information server, or a combination thereof.

8. An apparatus comprising:
    at least one processor; and
    at least one memory including computer program code for one or more programs,
    the at least one memory and the computer program code configured to, with the at least one processor, cause the apparatus to perform at least the following,
        configure, at an information server, a refer request for requesting information pertaining to a refer-to entity, wherein the refer request comprises an identifier of the refer-to entity that is a recipient of the refer request and a pre-defined parameter value that eliminates a subscription to the recipient by the information server, the recipient being a network entity different from the information server and the external information sources, and
        issue, by the information server, the refer request to the recipient.

9. An apparatus of claim 8, wherein the refer request includes the information server in a refer-to header, and the information is presence information of the recipient.

10. An apparatus of claim 9, wherein the refer request is a refer request according to the session initiation protocol, and the pre-defined parameter value is included in a refer-sub header field of the refer request.

11. A method, comprising:
    receiving a refer request for requesting information pertaining to a refer-to entity from an information server at a recipient, wherein the refer request comprises an identifier of the refer-to entity that is the recipient and a pre-defined parameter value that eliminates a subscription to the recipient by the information server, the recipient being a network entity different from the information server and external information sources;
    checking, by the recipient, the refer request to determine if the information shall be provided in response to the refer request, and
    transmitting, by the recipient, the information based at least in part, on the checking.

12. A method of claim 11, wherein the refer request includes the information server in a refer-to header, and the information is presence information of the recipient.

13. A method of claim 12, wherein the refer request is a refer request according to the session initiation protocol, and the pre-defined parameter value is included in a refer-sub header field of the refer request.

14. A method of claim 11, wherein the refer request is forwarded by a session initiation protocol core network to the recipient based on one or more filtering rules.

15. A method of claim 14, wherein a routing of the refer request is encoded in an internet protocol multimedia subsystem initial filter criterion.

16. A method of claim 11, wherein the refer request further comprises another pre-defined parameter value that triggers the recipient to provide the information upon reception of the refer request without referring to external information sources.

17. A method of claim 16, wherein the another pre-defined parameter is a method parameter of publishing the information by the recipient, the information server, or a combination thereof.

18. An apparatus comprising:
    at least one processor; and
    at least one memory including computer program code for one or more programs,
    the at least one memory and the computer program code configured to, with the at least one processor, cause the apparatus to perform at least the following,
        receive a refer request for requesting information pertaining to a refer-to entity from an information server at a recipient, wherein the refer request comprises an identifier of the refer-to entity that is the recipient and a pre-defined parameter value that eliminates a subscription to the recipient by the information server, the recipient being a network entity different from the information server and external information sources;

check, by the recipient, the refer request to determine if the information shall be provided in response to the refer request, and transmit, by the recipient, the information based at least in part, on the checking.

19. An apparatus of claim 18, wherein the refer request includes the information server in a refer-to header, and the information is presence information of the recipient.

20. An apparatus of claim 19, wherein the refer request is a refer request according to the session initiation protocol, and the pre-defined parameter value is included in a refer-sub header field of the refer request.

* * * * *